United States Patent

Lindert

[11] 4,433,015
[45] Feb. 21, 1984

[54] TREATMENT OF METAL WITH DERIVATIVE OF POLY-4-VINYLPHENOL

[75] Inventor: Andreas Lindert, Troy, Mich.

[73] Assignee: Parker Chemical Company, Madison Heights, Mich.

[21] Appl. No.: 366,449

[22] Filed: Apr. 7, 1982

[51] Int. Cl.³ .................................. B05D 3/02
[52] U.S. Cl. .................. 427/388.4; 148/6.15 R; 427/388.2; 427/409; 524/543; 524/547; 524/551; 524/555
[58] Field of Search ............... 148/6.15 R; 427/388.2, 427/388.4, 207.1, 208.2, 409; 156/327, 330.9, 331.6; 524/555, 543, 551, 547

[56] References Cited

U.S. PATENT DOCUMENTS

| | | | |
|---|---|---|---|
| 3,196,039 | 7/1965 | Herbst et al. | 427/388.4 |
| 3,544,356 | 12/1970 | Vazirani | 427/207.1 |
| 4,032,513 | 6/1977 | Fujiwara et al. | 524/543 X |
| 4,165,242 | 8/1979 | Kelly et al. | 427/409 X |
| 4,233,088 | 11/1980 | Kronstein | 148/6.15 R X |

Primary Examiner—Thurman K. Page
Attorney, Agent, or Firm—Arthur E. Kluegel

[57] ABSTRACT

An aqueous solution comprising an effective amount of a water soluble or water dispersible compound selected from the group consisting of a polymer having the following general formula, acid salts thereof and mixtures thereof:

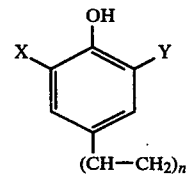

where:
n = from 2 up to a number at which the polymer is not water soluble or water dispersible;
X = H or Z;

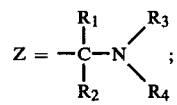

Y = H, Z, $C_rH_6OR_7$, or $CH_2Cl$;
$R_1$ through $R_7$ = H, or an alkyl, aryl, hydroxy-alkyl, amino-alkyl, mercaptoalkyl or phospho-alkyl moiety, said $R_1$ through $R_7$ being of carbon chain lengths up to a length at which the compound is not water soluble or dispersible;
wherein at least one of X or Y = Z and the Z moieties are present in sufficient amount that the compound is water soluble or water dispersible.

This solution is useful in the treatment of metal surfaces to impart corrosion resistance and paint adhesion characteristics thereto.

12 Claims, No Drawings

TREATMENT OF METAL WITH DERIVATIVE OF POLY-4-VINYLPHENOL

BACKGROUND OF THE INVENTION

The present invention relates to the art of metal surface treatment. More specifically, the present invention relates to treatment of metal surfaces with a dilute solution of a poly-4-vinylphenol derivative or an acid salt of a poly-4-vinylphenol derivative. The treatment imparts improved corrosion resistance and paint adhesion characteristics to the metal surfaces.

The need for applying protective coatings to metal surfaces for improved corrosion resistance and paint adhesion characteristics is well known in the metal finishing and other metal arts. Traditionally, metal surfaces are treated with chemicals which form a metal phosphate and/or metal oxide conversion coating on the metal surface to improve the corrosion resistance and paint adhesion thereof. Also traditionally, the conversion coated metal surfaces have been rinsed or post-treated with a solution containing a hexavalent chromium compound for even greater corrosion resistance and paint adhesion.

Because of the toxic nature of hexavalent chromium compounds, expensive treatment equipment must be used to remove chromates from water effluent to prevent the pollution of rivers, streams, and drinking water sources. Hence, although the corrosion resistance and paint adhesion characteristics of conversion coated metal surfaces can be enhanced by an after-treatment solution containing a hexavalent chromium compound, in recent years there have been research and development efforts directed to discovering effective alternatives to the use of such post-treatment solutions. One alternative is provided in my earlier U.S. patent application, Ser. No. 210,910 now U.S. Pat. No. 4,376,000, for Composition for and Method of After-Treatment of Phosphatized Metal Surfaces filed on Nov. 28, 1980. The post-treatment compound of my earlier application is used in post-treatment solutions having an alkaline pH. It would, however, be desirable to have a post-treatment compound useful in post-treatment solutions over a broad pH range and, in particular, useful in an acidic post-treatment solution.

In accordance with the present invention a novel composition which is alternative to hexavalent chromium compound containing solutions is provided for use in acidic post-treatment solutions in a novel process for the post-treatment of phosphatized or conversion coated metal surfaces. Also, the present invention provides a solution and method for treating previously untreated metal surfaces including aluminum and zinc metal surfaces. The solution and method of the present invention are effective to enhance the corrosion resistance and paint adhesion characteristics of a conversion coated or uncoated metal surface. Further understanding of this invention will be had from the following disclosure wherein all parts and percentages are by weight unless otherwise indicated.

SUMMARY OF THE INVENTION

A treatment solution of the present invention for contacting a metal surface is an aqueous solution comprising an effective amount of a water soluble or water dispersible compound selected from the group consisting of a polymer having the following general formula, acid salts thereof, and mixtures thereof:

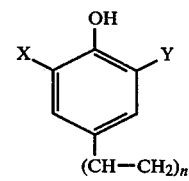

where:

$n$ = from 2 up to a number at which the polymer is not water soluble or water dispersible;

$X$ = H or Z;

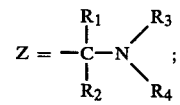

$Y$ = H, Z, $CR_5R_6OR_7$, or $CH_2Cl$;

$R_1$ through $R_7$ = H, or an alkyl, aryl, hydroxy-alkyl, amino-alkyl, mercapto-alkyl or phospho-alkyl moiety, said $R_1$ through $R_7$ being of carbon chain lengths up to a length at which the compound is not water soluble or dispersible;

wherein at least one of X or Y = Z and the Z moieties are present in sufficient amount that the compound is water dispersible;

In accordance with the method of the present invention, a metal surface is contacted with a solution comprising the aforementioned treatment compound to enhance the corrosion resistance and paint adhesion characteristics of the metal surface.

DETAILED DESCRIPTION OF THE INVENTION

Although the solution of the invention can be effectively applied to treated or untreated metal surfaces, generally speaking the best results will be obtained if the metal surface has previously been conversion coated. Conversion coatings are well known and have been described, for example, in *Metal Handbook*, Volume II, 8th Edition, pages 529–547 of the American Society for Metals and in *Metal Finishing Guidebook and Directory*, pages 590–603 (1972), the contents of both of which are specifically incorporated herein by reference.

In a typical metal treatment operation employing a composition and process of this invention, the metal to be treated is initially cleaned by a chemical or physical process and water rinsed to remove grease and dirt from the surface. The metal surface is then brought into contact with the treatment solution of this invention. Alternatively, instead of applying the treatment solution following the cleaning process, a conversion coating solution is applied to the metal surface in a conventional manner to form a conversion coating thereon. The conversion coated surface is then water rinsed and the metal surface is immediately brought into contact with the treatment solution of the present invention.

The present invention is useful with a broad range of metal surfaces, including metals having surfaces which can be conversion coated with suitable conversion coating compositions. Examples of suitable metal surfaces include zinc, iron, aluminum and cold-rolled, ground, pickled, and hot-rolled steel and galvanized steel surfaces. Examples of conversion coating solutions include solutions comprising iron phosphate, manganese phosphate, zinc phosphate, and zinc phosphate modified with calcium, nickel, or magnesium ions.

The treatment solution of the present invention is an aqueous solution comprising an effective amount of a water soluble or water dispersible compound selected from a polymer of a monomer having the following general formula, acid salts thereof and mixtures thereof:

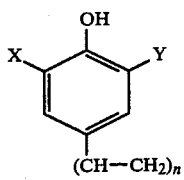

where:
n = from 2 up to a number at which the polymer is not water soluble or water dispersible;
X = H or Z

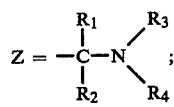

Y = H, Z, $CR_5R_6OR_7$, or $CH_2Cl$;

$R_1$ through $R_7$ = H, or an alkyl, aryl, hydroxy-alkyl, amino-alkyl, mercapto-alkyl or phospho-alkyl moiety, said $R_1$ through $R_7$ being of carbon chain lengths up to a length at which the compound is water insoluble; wherein at least one of X or Y = Z and the Z moieties are present in sufficient amount that the compound is water soluble or dispersible.

It will be appreciated that in the polymeric form, the treatment compound of the present invention can comprise a plurality of monomer units of the above general formula. For example, a polymeric compound of this invention can have the following general formula:

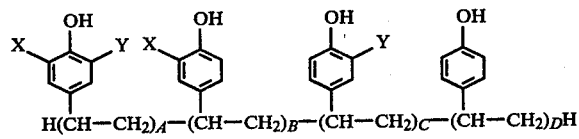

where X and Y are as defined above and wherein A, B, C, and D can be from 0 to a number at which the polymer is water insoluble under the conditions of use. A+B+C+D must be at least 2 and the methylene amine moiety, the Z moiety as defined above, must be present in sufficient amount so that when neutralized with an acid, the polymer is water soluble or water dispersible. The particular amount as a molar percent needed for water solubility or dispersibility depends upon the molecular weight of the polymers as well as the particular $R_1$ through $R_7$ moieties in the polymer. Generally speaking, the molar percent of amino group or Z per phenolic group may vary from 10% to 200% and is usually 50% to 150%; there being one phenolic group per monomer.

It will, of course, be appreciated that the treatment compound of the present invention is based on derivatives of poly-4-vinylphenol polymer. Suitable derivatives having the above general formula can be made, for example, by the Mannich Reaction. For example, a poly-4-vinylphenol polymer can be reacted with formaldehyde and a secondary amine to yield a product which can be neutralized with an organic or inorganic acid to yield a water soluble or dispersible solution or emulsion of the treatment compound of this invention.

The molecular weight of the poly-4-vinylphenol used in the preparation of derivatives claimed in the present invention can range from the monomer, or more usually low molecular weight oligomers of 360 to high molecular weight polymers of 30,000 or greater. The upper limit of molecular weight being determined by the functional limitation that the derivative therefrom be water soluble or water dispersible.

The resulting derivatives of the formula set forth hereinabove will typically have a molecular weight of up to about 200,000, with molecular weights within the range of about 700 to about 70,000 being preferred. In the formula given for these derivatives, a typical upper value for "n" is about 850, with values of from about 10 to 300 being preferred. Similarly, the carbon chain lengths of the R, through $R_7$ substituents will typically be from about 1 to 18, with carbon chain lengths of from about 1 to 12 being preferred. It will, of course, be appreciated, that in each instance, a value for "n" and for the carbon lengths, as well as the percent of the "Z" moiety, will be selected which will provide the desired amount of water solubility and/or dispersibility.

Although the treatment compounds of this invention are soluble in organic solvents and can be used as a treatment solution when dissolved in an organic solvent as, for example, ethanol, as a practical matter it will be desired to apply the treatment compound from a water solution. To provide the desired water solubility or water dispersibility of the compound, an organic or inorganic acid can be used for neutralization of the amine moiety thereof. Useful acids for this purpose are acetic acid, citric acid, oxalic acid, ascorbic acid, phenylphosphonic acid, -chloromethylphosphonic acid; mono, di and trichloroacetic acid, trifluoroacetic acid, nitric acid, phosphoric acid, hydrofluoric acid, sulfuric acid, boric acid, hydrochloric acid, hexafluorosilicic acid, hexafluorotitanic acid, hexafluorozirconic acid, and the like; alone or in combination with each other. The addition of water to the neutralized, over-neutralized or partially neutralized treatment compounds mentioned above results in a water soluble or dispersible solution or emulsion of the polymer useful for metal treatment.

The pH of the solution can vary from pH 0.5 to 12, but for practical purposes is usually kept between 2.0 to 8.0 both for the stability of the solution and for best results on the treated metal surface.

It is contemplated that the treatment compound of the present invention will be used in a working solution at a dilute concentration of, for example, from about 0.01% to about 5% by weight. Practically speaking, a concentration of 0.1% to 1% is preferred in the working solution. However, under some circumstances, for example, for transporting or storing the solution, a concentrate of the solution may be preferred. Thus, a solution comprising up to 30% of the treatment compound might be provided. From a commercial point of view, a suitable concentrate of this invention comprises from about 5% to about 30% of the treatment compound.

Application of the treatment solution of the present invention in the treatment step to a metal surface can be carried out by any conventional method. While it is contemplated that the metal surface will preferably be a conversion coated metal surface, the treatment step can alternatively be carried out on an untreated metal surface to improve the corrosion resistance and paint adhesion thereof. For example, the treatment solution can be applied by spray coating, roller coating, or dipping. The temperature of the solution applied can vary over a wide range, but is preferably from 70° F. to 160° F. After application of the treatment solution to the metal surface, the surface can optionally be rinsed, although good results can be obtained without rinsing after treatment. For some end uses, for example, in electrocoat paint application, rinsing may be preferred.

Next, the treated metal surface is dried. Drying can be carried out by, for example, circulating air or oven drying. While room temperature drying can be employed, it is preferably to use elevated temperatures to decrease the amount of drying time required.

After drying, the treated metal surface is then ready for painting or the like. The surface is suitable for standard paint or other coating application techniques such as brush painting, spray painting, electro-static coating, dipping, roller coating, as well as electrocoating. As a result of the treatment step of the present invention, the conversion coated surface has improved paint adhesion and corrosion resistance characteristics. Further understanding of the present invention can be had from the following illustrative examples.

EXAMPLE 1

100 lbs. of 95% ethanol solvent was charged into a 100 gallon stainless steel reactor containing a turbine blade, nitrogen sparge and condenser. Gentle heating to 50° C. was started, and 80 lbs. of poly-4-vinylphenol polymer of a molecular weight of 5000 was slowly added to the solvent with good stirring. After all of the polymer was added, the reactor was closed and heated to 80° C. to aid in dissolving the remaining polymer. The reactor was then cooled to 40° C. and 50 lbs. of N-Methylaminoethanol and 100 lbs. of deionized water were added. Then over one (1) hour 54.1 lbs. of 37% formaldehyde solution was added while maintaining the temperature at 40° C. to +2° C. The reactor was then heated for 3 hours at 40° C. and 315 lbs. of 10% nitric acid was added and diluted to 20% solids with deionized water to yield a stable solution of a treatment compound of the present invention in water.

EXAMPLE 2

100 g. of cellosolve solvent was charged into a reactor which was a 1000 ml reaction flask equipped with a condenser, nitrogen sparge, overhead mechanical stirrer and a thermometer. Then 80 gm of poly-4-vinylphenol having a molecular weight of 5000 was added and dissolved. 700 gm of diethanol amine and 100 gm of deionized water were added and reaction heated to 50° C. 108 gm of 37% formaldehyde solution was added over 1 hour and heated an additional 3 hours at 50° C. and then 3 hours at 80° C. The reaction was cooled and 65 gm of 75% phosphonic acid and then 227 gm of deionized water were added. The product gave a stable solution of a treatment compound of the present invention in water.

EXAMPLE 3

A cold rolled steel 24 gauge panel which had been oiled to prevent corrosion in shipping was cleaned with mineral oil and then further cleaned using an aqueous solution of a strong alkaline cleaner (sold under the trademark PARCO ® Cleaner 338 by Parker Division, Hooker Chemicals & Plastics Corp.) by a spray application at 150° F. solution temperature for 60 seconds; followed by the application of an iron phosphate conversion coating (sold under the trademark BONDERITE ® 1014 by Parker Division, Hooker Chemicals & Plastics Corp.) for 60 seconds at 110° F. After the conversion coating treatment, the panels were rinsed with cold tap water for 30 seconds and then treated with a 0.5% solution of the compound of Example I for 30 seconds at a 110° F. solution temperature by a spray application. The panels were then rinsed and dried in an oven at 350° F. for 5 minutes.

The panels were painted with a standard Duracron 200 paint and tested by the standard salt spray method. (ASTM © B-117). After 504 hours, the panels treated with Example I as described above gave results equivalent to the standard chromium treated control panels.

While the above disclosure sets forth and describes various embodiments of the present invention, the compositions and methods described are intended to illustrate but not limit the present invention, it being understood that the specific embodiments described herein are subject to variation and modification by one skilled in the art having benefit of the foregoing disclosure. Therefore, it is intended that the scope of the present invention is to be limited solely by the following claims.

What is claimed is:

1. A stable aqueous composition comprising an effective amount of a water soluble or water dispersible compound selected from the group consisting of a polymer having the following general formula, acid salts thereof and mixtures thereof:

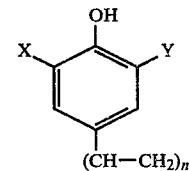

where:
n = from 2 up to a number at which the polymer is not water soluble or water dispersible;
X = H or Z;

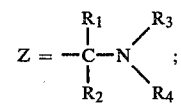

Y = H, Z, $CR_5R_6OR_7$, or $CH_2Cl$;
$R_1$ through $R_7$ = H, or an alkyl, aryl, hydroxy-alkyl, amino-alkyl, mercapto-alkyl or phospho-alkyl moiety, said $R_1$ through $R_7$ being of carbon chain lengths up to a length at which the compound is not water soluble or dispersible;
wherein at least one of X or Y = Z and the Z moieties are present in sufficient amount that the compound is water soluble or water dispersible to form such stable aqueous composition.

2. The aqueous composition of claim 1 wherein the molar percent of Z per monomer is from about 10% to about 200%.

3. The aqueous composition of claim 1 wherein the molar percent of Z per monomer is from about 50% to about 150%.

4. The aqueous composition of claim 1 wherein the pH is from about 0.5 to about 12.

5. The aqueous composition of claim 4 wherein the pH is from about 2.0 to about 8.0.

6. The aqueous composition of claim 4 wherein said compound is present in an amount of from about 0.01% to about 5%.

7. The aqueous composition of claim 6 wherein said compound is present in an amount of from about 0.1% to about 1%.

8. The aqueous composition of claim 1 wherein said compound is present in an amount of from about 5% to about 30%.

9. The aqueous composition of claim 1 wherein Z is

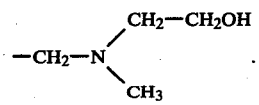

10. The aqueous composition of claim 1 wherein Z is

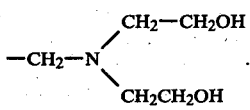

11. The aqueous composition of claim 1 wherein said compound is the reaction product of a poly-4-vinylphenol, formaldehyde and a secondary amine.

12. The process of treating a metal surface comprising contacting a metal surface with a composition of any of claims 2 through 11 for a period of time sufficient to impart improved corrosion resistance and/or paint adhesion characteristics to the metal surface and, thereafter, drying the thus-treated surface.

* * * * *